Patented Nov. 23, 1937

2,100,228

UNITED STATES PATENT OFFICE 2,100,228

PROCESS FOR THE DEALKYLATION OF ALKYL-ARYL ETHERS

John M. Tinker, Penns Grove, and Viktor M. Weinmayr, Pitman, N. J., assignors to E. I. du Pont de Nemours & Company, Wilmington, Del., a corporation of Delaware No Drawing. Application May 27, 1936, Serial No. 82,150

8 Claims. (Cl. 260—154)

This invention relates to the dealkylation of aryl alkyl ethers and more particularly to dealkylation of aryl alkyl ethers in the presence of aliphatic amines in the form of their hydrohalides.

In the prior art aryl alkyl ethers have been dealkylated in the presence of aromatic amines, as revealed by published articles on the subject, but so far as applicants are aware, it is new to use the less costly and more effective aliphatic amines and their hydrohalides in the dealkylation.

An object of this invention is to provide an improved process for the dealkylation of aryl alkyl ethers. Another object is to provide a use for various amines which heretofore have had little technical application.

These and other objects which may be incident to our improvement are accomplished by the following invention, wherein aryl alkyl ethers are heated in the presence of aliphatic amine hydrohalides. The alkyl groups split off as alkyl halides and totally or partially dealkylated compounds are obtained.

The following example, in which the parts are by weight, is illustrative of the method of our invention. This example describes the preparation of pyrocatechol from guaiacol.

*Example*

372 parts of guaiacol (3 mols) are put into a suitable reaction vessel, for instance a glass tube 15 inches long and 1¾ inches wide and 18 parts of trimethylamine are added at room temperature. Dry gaseous, hydrochloric acid is introduced through a capillary tube or a gas distributing tube reaching to the bottom of the reaction tube, and the reaction mass is heated to 180–200° C. by immersing the reaction tube into a deep oil bath. Methyl chloride begins to come off soon and is evolved at 180–200° C. at such a rate that all hydrochloric acid introduced is converted to the alkyl chloride. The reaction is finished when no more methyl chloride is evolved. The methyl chloride formed may be collected and used for other reactions. The reaction time depends mainly upon the speed with which hydrochloric acid can be introduced without causing mechanical losses of the reaction product by the sweep of methyl chloride evolved.

The finished reaction mass weighs 370 grams and is a red crystalline solid with a crystallizing point of about 88° C. Hydrochloric acid fumes are given off only slightly. It contains 4.76% chlorine and 1.9% nitrogen. Pure pyrocatechol of a crystallizing point of 103.5 to 104° C. can be obtained from this crude reaction product with a yield of 90–95% based on guaiacol. It may be isolated by dissolving the crude product in water, extracting the pyrocatechol with an immiscible solvent, such as ether, and purifying it by crystallization or distillation, or it may be isolated according to the method described in our copending patent application, Serial Number 82,151 filed, May 27, 1936, that is by direct fractionation of the crude condensation mass.

As will be understood by those skilled in the art, our process may be conducted with various deviations from the temperatures, equipment and particular ingredients of the foregoing example. Many other compounds besides pyrocatechol may be prepared by this reaction. 1-2-3 trihydroxy benzene is obtained from the corresponding trimethoxy benzene, 3-oxy-4-methoxy-benzoic acid is thus prepared from 3-4-dimethoxy phthalic acid or its anhydride, alpha and beta naphthol are formed from alpha and beta ethoxy naphthalene.

Monomethylamine, dimethylamine, mixtures of mono-, di- and trimethylamine, and other aliphatic amines, for instance ethanol amines, may be used.

Other hydrohalic acids, such as hydrobromic acid may be used instead of hydrochloric acid.

The reaction temperatures may vary widely. Evolution of alkyl halide is noticeable in certain cases at a temperature as low as 140° C. In general the higher the temperature used for reaction, the shorter the time of reaction will be.

Smaller or larger amounts than 0.1 mol. of amine-hydrochloride per mol. of alkyl ether may be used.

The aliphatic amines may be added to the alkyl ethers and the hydrohalic acid may be introduced to form the hydrohalide, or the amine hydrohalide may be prepared separately and then mixed with the alkyl ethers.

Frequently it is not necessary to make certain that dealkylation has been completed since unreacted starting material may be easily separated from the reaction products and used again.

It could not be foreseen from the prior art that aliphatic amines which react in many ways different from aromatic amines would be particularly suitable for this dealkylation of aryl alkyl ethers. Aliphatic amines are much stronger bases than the aromatic amines. The dissociation constants for the first OH of aliphatic amines range from $1.26 \times 10^{-3}$ to $9.6 \times 10^{-4}$ while the aromatic amines range from $8 \times 10^{-9}$ to $9.9 \times 10^{-11}$. Therefore, the salts of aliphatic amines with mineral acids are less acidic being salts of stronger bases with strong acids.

In addition to the advantage of using cheaper amines or amines that are of little technical use, such as trimethylamine, the dealkylated compounds which are obtained by our process are of higher purity than those obtained when aromatic amines are used. For example, under the same process of purification, pyrocatechol prepared by demethylating guaiacol with aromatic amine hydrochlorides was not stable and turned black within a few hours, while a stable white pyrocatechol was obtained when hydrochlorides of aliphatic amines were used for the demethylation.

As many apparently widely different embodiments of this invention may be made without departing from the spirit and scope thereof, it is to be understood that we do not limit ourselves to the specific embodiments thereof except as defined in the following claims.

We claim:

1. The improvement in a process of dealkylation of aryl alkyl ethers which comprises heating an aryl alkyl ether in the presence of an aliphatic amine hydrohalide until dealkylation is at least partially complete.

2. The improvement in a process of dealkylation of aryl alkyl ethers which comprises heating an aryl alkyl ether in the presence of an aliphatic amine while passing through the mixture a gaseous hydrohalic acid until dealkylation is at least partially complete.

3. The improvement in a process of dealkylation as in claim 2 in which the hydrohalic acid is hydrochloric acid.

4. The improvement in a process of dealkylation as in claim 2 in which the aliphatic amine used is trimethylamine.

5. A process for the preparation of pyrocatechol from guaiacol which comprises heating guaiacol in the presence of an aliphatic amine hydrohalide until demethylation of the guaiacol is at least partially complete.

6. A process for the preparation of pyrocatechol from guaiacol which comprises heating guaiacol in the presence of an aliphatic amine while passing a gaseous hydrohalic acid through the mixture until demethylation of the guaiacol is at least partially complete.

7. A process for the preparation of pyrocatechol from guaiacol which comprises heating guaiacol in the presence of trimethylamine and gaseous hydrochloric acid until demethylation of the guaiacol is at least partially complete.

8. The improvement in the process of dealkylating aryl alkyl ethers in which aromatic amine hydrohalides have been used which comprises substitution of an aliphatic amine hydrohalide as the dealkylating agent.

JOHN M. TINKER.
VIKTOR M. WEINMAYR.